United States Patent [19]

Roba

[11] Patent Number: 4,657,575

[45] Date of Patent: Apr. 14, 1987

[54] METHOD OF FABRICATING ALUMINA-DOPED SILICA FIBERS

[75] Inventor: Giacomo Roba, Cogoleto, Italy

[73] Assignee: Cselt Centro Studie Laboratori Telecomunicazioni Spa, Torino, Italy

[21] Appl. No.: 779,081

[22] Filed: Sep. 20, 1985

[30] Foreign Application Priority Data

Nov. 13, 1984 [IT] Italy .............................. 68135 A/84

[51] Int. Cl.⁴ ...................... C03C 25/02; C03B 37/025
[52] U.S. Cl. ..................................... 65/3.12; 65/18.2; 427/163
[58] Field of Search .................. 65/2, 3.11, 3.12, 18.2; 427/163

[56] References Cited

U.S. PATENT DOCUMENTS 4,217,027 8/1980 MacChesney et al. .......... 65/3.12 X

FOREIGN PATENT DOCUMENTS 59-184748 10/1984 Japan ................................... 65/3.12

*Primary Examiner*—Robert Lindsay
*Attorney, Agent, or Firm*—Karl F. Ross; Herbert Dubno

[57] ABSTRACT

The method of fabricating alumina-doped silica fibers allows the production of silica and dopant with reactions between gaseous chemical compounds. Alumina is obtained from a reaction between oxygen and a low-temperature vaporizable organometallic compound. The optical fibers produced do not present the refraction-index dip and exhibit low attenuation.

2 Claims, No Drawings

METHOD OF FABRICATING ALUMINA-DOPED SILICA FIBERS

FIELD OF THE INVENTION

The present invention relates to the industrial manufacture of physical carriers for optical telecommunications systems and, more particularly, to a method of fabricating alumina-doped silica fibers.

BACKGROUND OF THE INVENTION

As is known, germanium oxide ($GeO_2$) is chiefly used as dopant for fabricating an optical-fiber core, both in case of inside processes (IVPO) and in case of outside processes (OVPO). In fact, $GeO_2$ gives with silica a binary compound having a stable vitreous structure. Besides, a haloid vehicle, wherefrom germanium tetrachloride ($GeCl_4$) is obtained by oxidation synthesis, is particularly well suited for use in CVD techniques, since, at room temperature, it is an easily vaporizable liquid (melting temperature $T_F=49.5°$ C.; boiling temperature $T_E=84°$ C.).

The optical properties of germanium oxide are particularly interesting: zero material dispersion of wavelengths greater than 18 $\mu m$, infrared absorption peak due to molecular vibration of $G_e$-O bond centered at a wavelength of about 12 $\mu m$.

The latter property prevents it from modifying the silica spectral-attenuation curve, which presents an infrared absorption peak for the molecular vibration of Si-O bond centered at a slightly lower wavelength (9.1 $\mu m$).

For these reasons germanium oxide is nowadays the most widely used dopant compound in optical-fiber technology and the only one used for fabricating the core of silica-based optical fibers.

Its use has, however, two disadvantages:
(i) high cost of raw material; and
(ii) Rayleigh scattering coefficient higher than that of pure silica, whose value is about 0.6 $dB/Km/\mu m^4$.

Germanium in the lattice structure of binary $SiO_2$-$GeO_2$ is capable of increasing the scattering coefficient value proportionally to the concentration of the dopant present in the lattice;

For example, in the case of 3% molar germanium concentration (typical concentration for a monomode step-index fiber with $\Delta n=3\%$, optimized for the second transmission window at 1.3 $\mu m$) the Rayleigh scattering coefficient undergoes an increase of 0.2 $dB/Km/\mu m^4$. If the molar concentration is increased to beyond 20% to obtain the displacement of the zone of minimum chromatic dispersion, a value of Rayleigh scattering coefficient higher than 2 $dB/Km/\mu m^4$ would be reached. That is detrimental to performance because of the excessively high rise of minimum attenuation values.

Alumina ($Al_2O_3$) is an alternative material to $GeO_2$, in fact, in addition to having all the advantages of germanium oxide, it affords the following characteristics:
(a) Rayleigh scattering coefficient less than to that of silica;
(b) lower cost of raw materials; and
(c) high melting temperature.

It is of interest to underline the fact that a scattering coefficient lower than that of silica can allow the lowest attenuation levels to be reached for silica-based vitreous lattices.

More particularly with vitreous lattices of $SiO_2$-$Al_2O_3$ a minimum attenuation value lower than that of silica can be obtained; for silica this value is equal to 0.12 $dB/Km$ in the wavelength range of 1.56 $\mu m$.

Point (c), i.e. high melting temperature, allows a number of interesting remarks. The melting temperature of alumina (2045° C.) is higher than those of silica (1703° C.) and of germanium oxide (1086° C.).

The physical properties of the lattices $SiO_2$-$Al_2O_3$ are hence more similar to those of an $SiO_2$ lattice than those of an $SiO_2$-$GeO_2$.

In addition, the presence of a compound with higher melting point prevents the dopant from diffusing towards the periphery during the preform collapsing step.

As a consequence, alumina-doped silica fibers fabricated by the MCVD technique do not show any dip (i.e. central refractive index decrease). This is a typical anomaly in the profile of germanium-oxide doped silica fibers, fabricated with the same method.

A confirmation of the latter property has been already reported in the paper entitled "Fabrication of Low-Loss $Al_2O_3$ doped silica fibers" by Y. Ohmori et al, Electronics Letters, Sept. 2, 1982, Vol. 18, No. 18.

The main disadvantage preventing alumina from being industrially utilized is that liquid or gaseous compounds at room temperature, to be used as aluminum vehicles and hence suited to CVD techniques, do not exist.

Aluminum halides are solid at room temperature and have rather high boiling temperatures. For example, $AlF_3$ sublimes at 1291° C., $AlCl_3$ sublimes at 178° C., $AlBr_3$ melts at 97° C. and boils at 263° C., $AlI_3$ melts at 191° C. and boils at 360° C. The use of the CVD technique with such raw materials requires reactant mixing and vaporization lines thermostated at high temperature. That entails difficulties and does not assure pollution-free synthesis products.

Besides, solid compounds at room temperature are more difficult to purify than liquid or gaseous ones; hence they can contain residual impurities detrimental to optical properties.

The use of $AlCl_3$ as a basic aluminum vehicle has been already suggested in the above cited paper, yet no valuable result has been obtained.

SUMMARY OF THE INVENTION

Said disadvantages are overcome and the above described technical problem is solved by the method of fabricating alumina-doped silica fibers provided by the present invention which allows silica to be doped with alumina by using a chemical-vapor-deposition technique (CVD) without requiring the use of vaporization and mixing lines thermostated at high temperature. The obtained optical fibers present low attenuation and are not affected with the dip.

The present invention involves a method of fabricating alumina-doped silica fibers, wherein silica and dopant are obtained by a reaction between gaseous chemical compounds, wherein the dopant above is obtained by the reaction between oxygen and an organometallic compound of the formula $Al(C_\alpha H_\beta)_\xi$ or $AlCl(C_\alpha H_\beta)_\psi$ types, where $\alpha$ and $\beta$ are respectively the coefficients of presence of molecules of atoms C, H and $\xi$ and $\psi$ are the coefficients of the group $C_\alpha H_\beta$, respectively.

These formulas correspond to $AlCl(C_a H_b)_z$ and $AlCl(C_a H_b)_p$ where a, b, z and p correspond respectively to the atomic and molecular coefficients mentioned previously.

Further preferred details of the invention will appear from the following description, by way of non limiting example, of an embodiment of the invention.

Alumina to be used as silica dopant in a CVD process is obtained from organometallic aluminum compounds, such as, e.g, Trimethylaluminum, Triethylaluminum, Dimethylaluminum chloride and Diethylaluminum chloride. The chemical formulae, melting temperatures $T_F$ and boiling temperatures $T_E$ of these four compounds are reported as follows:

| Compound | Formula | $T_F$ | $T_E$ |
|---|---|---|---|
| Trymethylaluminum | Al(CH$_3$)$_3$ | 0 | 190 |
| Triethyalaluminum | Al(C$_2$H$_5$)$_3$ | −50.5 | 194 |
| Dimethylaluminum chloride | AlCl(CH$_3$)$_2$ | −50 | 84 under a 200 Torr pressure |
| Diethylaluminum chloride | AlCl(C$_2$H$_5$)$_2$ | −50 | 126 under a 60 Torr pressure |

They are compounds either of the Al(C$_{60}$H$_{62}$)$_\xi$ or of AlCl(C$_\alpha$H$_\beta$)$_\xi$ type, where $\alpha$, $\beta$ and $\xi$ are respectively the coefficients of presence in molecules of atoms C and H and the C$_\alpha$H$_\beta$ group, which can vaporize at rather low temperature.

Such compounds in presence of oxygen give rise to the following reactions:

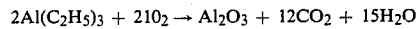

2Al(C$_2$H$_5$)$_3$ + 21O$_2$ → Al$_2$O$_3$ + 12CO$_2$ + 15H$_2$O

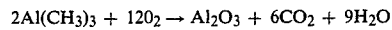

2Al(CH$_3$)$_3$ + 12O$_2$ → Al$_2$O$_3$ + 6CO$_2$ + 9H$_2$O

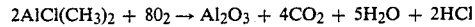

2AlCl(CH$_3$)$_2$ + 8O$_2$ → Al$_2$O$_3$ + 4CO$_2$ + 5H$_2$O + 2HCl

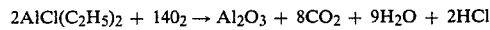

2AlCl(C$_2$H$_5$)$_2$ + 14O$_2$ → Al$_2$O$_3$ + 8CO$_2$ + 9H$_2$O + 2HCl

In addition to alumina (Al$_2$O$_3$), the reaction gives water, carbon dioxide, hydrochloric acid.

HCl and CO$_2$ are volatile and are carried off with the main flow of reaction products and reactants which have not participated in the reaction. The water could be incorporated with the network and cause optical absorption losses.

In case outside processes were used (OVPO=outside vapor phase oxidation), such as e.g. OVD (outside vapor deposition) and VAD (vapor axial deposition), the water incorporated during the synthesis is expelled during the drying and consolidating phase, after the deposition. Reaction products CO$_2$, HCl, H$_2$O are also typical products of basic reactions of these deposition techniques and hence they do not give rise to pollution problems.

Using inside deposition techniques (IVPO) such as, e.g. MCVD technique (Modified Chemical Vapor Deposition) the "soft", i.e. non-consolidated, deposit is subjected to a layer by layer dehydration and consolidation of the deposit in presence of chlorine as dehydrating agent.

This operation does not reduce the process productivity in case of monomode-fiber manufacture, as the number of layers necessary to core fabrication is quite limited.

It is clear that what described has been given only by way of non limiting example. Variations and modifications are possible without going out of the scope of the present invention.

More particularly, other organometallic aluminum compounds can be used to produce alumina according to the present method of fabricating optical fiber.

I claim:

1. In a method of fabricating alumina doped silica optical fibers wherein silica and dopant are obtained by a reaction between gaseous compounds, the improvement which comprises generating alumina dopant by effecting a reaction between an organometallic compound of the formula Al(C$_a$H$_b$)$_z$ or of the formula AlCl(C$_a$H$_b$)$_p$ where a and b are atomic coefficients of carbon and hydrogen in the molecule and z and p are molecular coefficients of C$_a$H$_b$ in the molecule, and oxygen to produce Al$_2$O$_3$ and gaseous products which are carried away.

2. The improvement defined in claim 1 wherein said organometallic compound is selected from the group which consists of: Al(CH$_3$)$_3$, Al(C$_2$H$_5$)$_3$, AlCl(CH$_3$)$_2$ and AlCl(C$_2$H$_5$)$_2$.

* * * * *